Figure 1:
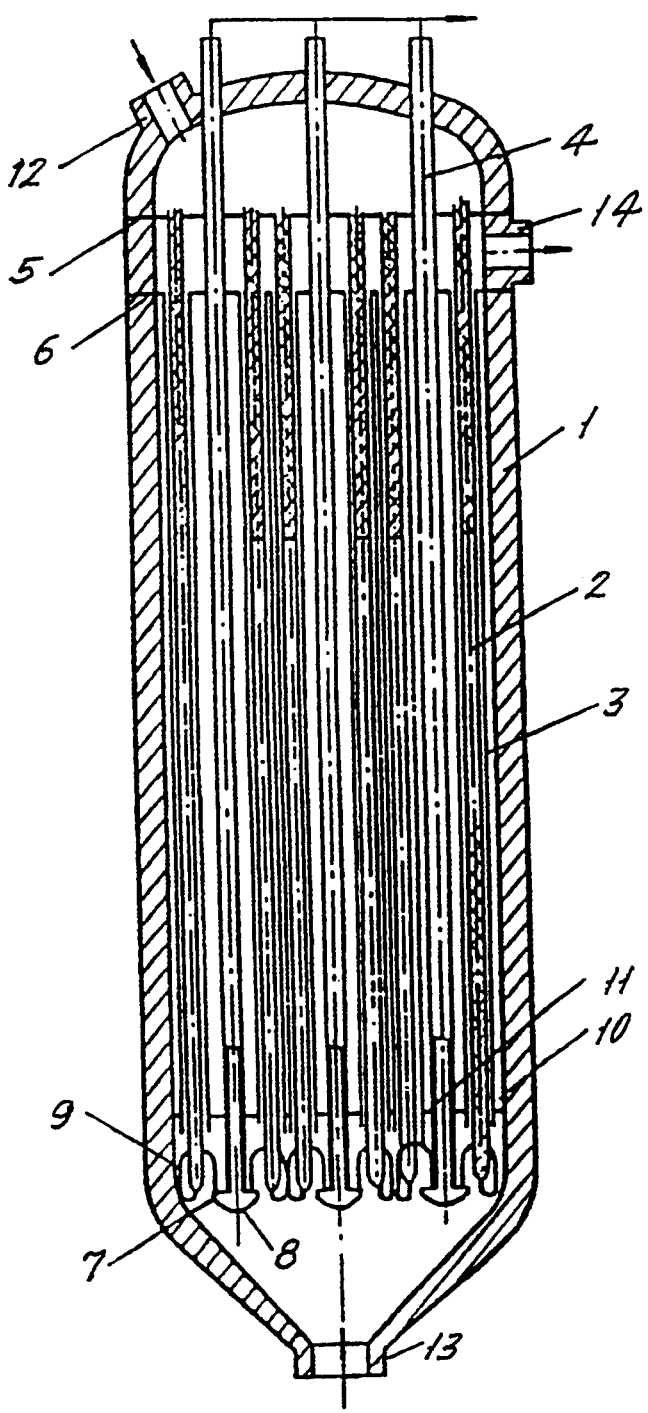

United States Patent [19]

Sosna et al.

[11] Patent Number: 5,399,321
[45] Date of Patent: Mar. 21, 1995

[54] TUBULAR PRESSURIZED CATALYTIC HYDROCARBON CONVERTER

[75] Inventors: Mikail H. Sosna; Vladimir P. Semenov; Valentin V. Harlamov; Leonid Y. Krotov, all of Moscow; Boris S. Zats; Isaak M. Zinger, both of Penza; Isaak E. Bondar, Moscow; Galina N. Jakusheva, Moscow; Lidya Z. Nikolova, Moscow; Vladimir F. Efankin, Penza; Gennadii F. Kiselev, Moscow, all of Russian Federation; Vladimir K. Chubukov, deceased, late of Moscow, Russian Federation, by Olga A. Chubukova, heir; Vladimir P. Gavrilin, deceased, late of Moscow, Russian Federation, by Lidiya I. Suchkova, heir

[73] Assignee: Compagnie Francaise D'Etudes et de Construction Technip, Courbevoie, France

[21] Appl. No.: 778,179
[22] PCT Filed: Apr. 12, 1991
[86] PCT No.: PCT/FR91/00309
§ 371 Date: Apr. 29, 1993
§ 102(e) Date: Apr. 29, 1993
[87] PCT Pub. No.: WO91/16129
PCT Pub. Date: Oct. 31, 1991

[30] Foreign Application Priority Data

Apr. 13, 1990 [FR] France .................. 90 04828

[51] Int. Cl.$^6$ .................. B01J 8/18
[52] U.S. Cl. .................. 422/197; 422/196; 422/200; 422/211; 422/221
[58] Field of Search .......... 422/196, 197, 200, 211, 422/221

[56] References Cited

U.S. PATENT DOCUMENTS 3,870,476  3/1975  Marsch .................. 422/208

FOREIGN PATENT DOCUMENTS 2042996  4/1971  Germany .
2709621  9/1977  Germany .

Primary Examiner—Timothy M. McMahon
Attorney, Agent, or Firm—Ostrolenk, Faber, Gerb & Soffen

[57] ABSTRACT

A tubular pressurized catalytic hydrocarbon converter provided with a cylindrical casing (1) containing vertical gas exhaust pipes (4) around which are arranged reaction tubes (2) which are coaxially placed in sleeves (3). The lower portions of these tubes are connected to the vertical pipes by "pig-tails" and have a novel design since the aim is to increase the converter's reliability and working life by eliminating reaction tube deformation and facilitating "pig-tail" assembly and maintenance. To this end, the converter is provided with a transverse wall attached to the lower ends of the sleeves and provided with openings in which the lower ends of the tubes and vertical pipes are freely inserted. It is also provided with plates (7) having movable covers (8) and attached to the lower ends of the vertical pipes which are in turn connected to the "pig-tails".

2 Claims, 2 Drawing Sheets

TUBULAR PRESSURIZED CATALYTIC HYDROCARBON CONVERTER

The present invention relates to a catalytic tubular and pressurized converter for hydrocarbons which may be used in the chemical industry, the petrochemistry, the metallurgy and in other industrial branches connected with the production of ammonia, methanol, hydrogen.

One knows well the catalytic tubular and pressurized converter for hydrocarbons consisting of a cylindrical envelope inside of which are disposed vertical reaction tubes the ends of which are connected to inlet and discharge devices for the gases by compensation "pig tails" (English patent No. 1,093,943).

The defect of this well known converter resides mainly in the fact that it is necessary to compensate with the assistance of the "pig tails" for the expansion of the reaction tubes under the effect of the temperature, which may represent in practice an elongation of 200 mm. On the other hand the "pig tails" are not accessible, thereby preventing from proceeding with their replacement if they are out of service.

There exists another type of catalytic tubular and pressurized converter for hydrocarbons much closer through its technical concept to the model forming the subject of the invention. It is a converter consisting of a cylindrical envelope inside of which are disposed rising columns for the discharge of gases. Around these rising columns are grouped and disposed coaxially within sheaths the reaction tubes the lower ends of which are connected to the gas discharge rising columns by means of "pig tails" (English patent No. 1,376,187).

The compensation device of this apparatus exhibits an advantage since in this case it is necessary to only compensate for the difference between the thermal expansions of the tubes and the columns. On the other hand it exhibits a series of inconveniences.

The reaction tubes having a tendency to incurvate themselves when they are heated at a high temperature, one finds in this apparatus a transverse deformation of the "pig tails", which result in a reduction of their life and of their reliability.

Moreover the concept of this apparatus provides a direct connection of the "pig tails" to the outer surface of the rising columns. Consequently even in the case of the arrangment of the "pig tails" on a single level, one portion of the weld bead located on the part facing the nest remains inaccessible, thereby also reducing the reliability of the compensation system. It is impossible to replace the "pig tails" which are out of service without proceeding with the complete disassembling of the tubes. The present invention has as its object to increase the reliability and the life by suppressing the transverse deformation of the reaction tubes and by facilitating the mounting of the "pig tails". The goal set could be attained by fitting the converter with a transverse partition fastened to the lower ends of the sheaths and provided with orifices allowing to freely introduce the lower ends of the rising columns themselves connected to the "pig tails".

The converter exhibits the following advantages.

Firstly the transverse partition provided with orifices in which are freely disposed the reaction tubes allows to avoid any transverse deformation of the "pig tails" and consequently to eliminate the additional forces, thereby increasing the reliability of the apparatus.

Secondly the transverse partition allows to avoid the substantial flexures of the reaction tubes and therefore allows an easy dismantling of the tubes by giving the possibility to separately replace some tubes out of service. The life of the converter is improved owing to this fact.

Thirdly the presence of plates with removable covers on the rising columns allows to ensure the access to the ends of the "pig tails" and consequently the replacement of the latter as soon as they are out of service. From this point of view again the life of the converter is increased.

Figure 2:
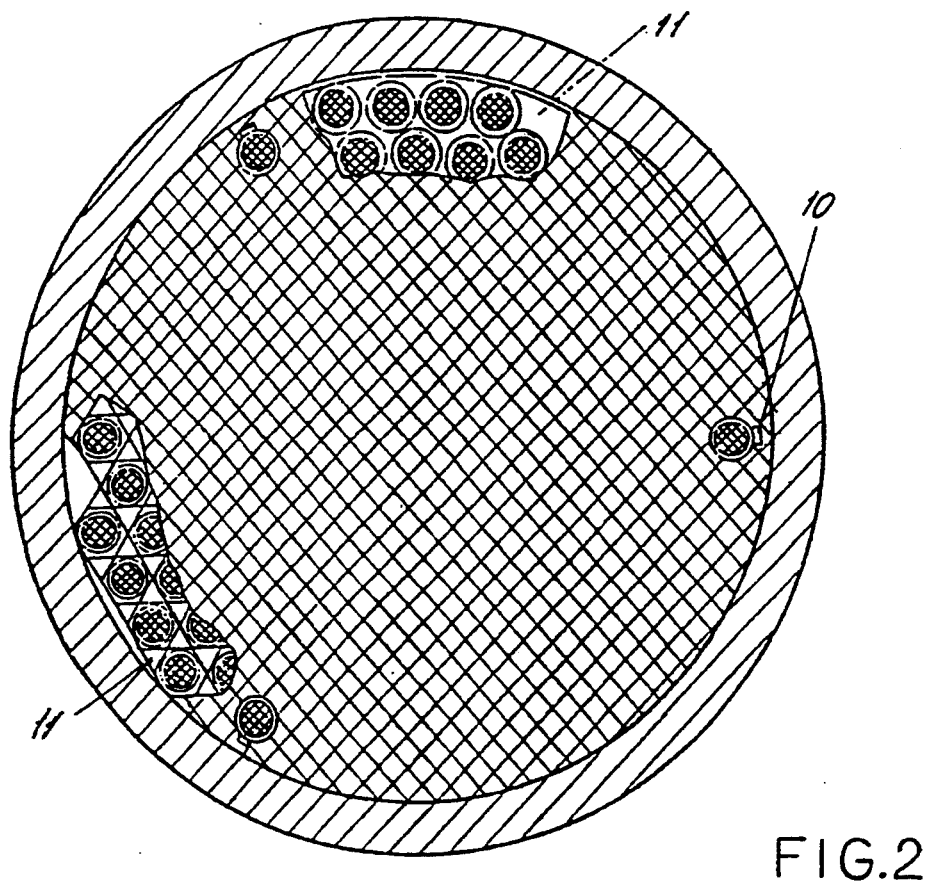
Figure 3:
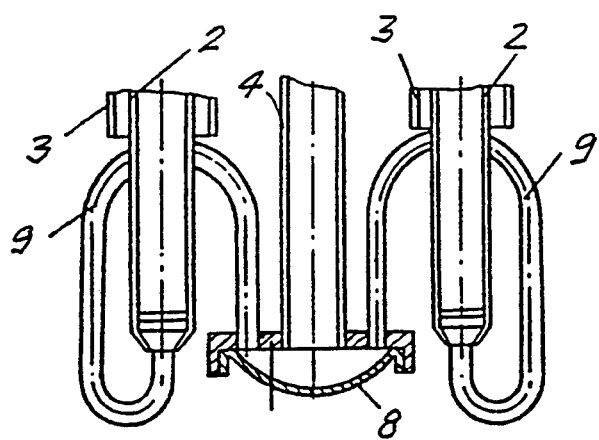
Figure 4:
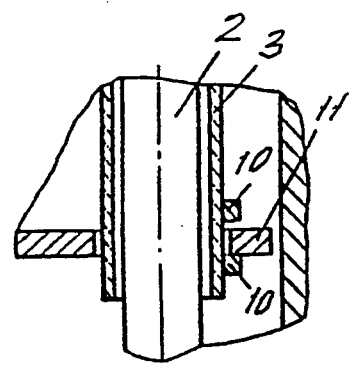

FIG. 1 shows a general view in section of the catalytic tubular and pressurized converter for hydrocarbons, FIG. 2 shows a transverse partition provided with orifices, FIGS. 3 and 4 show details of the converter.

The catalytic tubular and pressurized converter for hydrocarbons comprises a cylindrical vessel (1) faced with a lining inside of which are lying vertical reaction tubes filled with a catalyst and coaxially disposed in sheaths (3) and grouped around rising columns (4) for the discharge of the gases. The reaction tubes (2) are fastened onto a fluid-tight supporting plate (5) and the sheaths are fastened onto another also fluid-tight plate (6). The lower ends of the rising columns for the discharge of the gases are fitted with plates (7) with removable covers (8). The plates (7) are connected to the compensation "pig tails" (9). On the lower ends of at least three sheaths are fastened two by two stops (10) between which the transverse partition (11) is disposed freely. On the other hand tappings have been provided on the body of the apparatus: for the supply of the gas-vapor mixture (12), for the introduction of the heat-carrying fluid (13) and for its discharge (14).

The converter operates in the following manner. The gas-vapor mixture under pressure is introduced into the vessel (1) through the tapping (12) and passes into the reaction tubes (2); simultaneously one injects the heat-conveying fluid into the shell portion through the tapping (13). The heat-carrying fluid passes through the existing clearances between the sheaths (3) and the tubes (2) and transmits the heat to the chemical reagents. The conversion of the hydrocarbons occurs in the reaction tubes (2) on the bed of the catalyst under the action of the heat transmitted by the heat-conveying fluid. The conversion gas formed is sent through the medium of the "pig tails" (9) into the rising columns (4) for the discharge of the gases and discharged from the converter. The proposed converter allows to increase the reliability and the life of the apparatus.

We claim:

1. A converter comprising a cylindrical vessel and inside of said vessel comprising:
    rising columns for the discharge of gases,
    reaction tubes grouped around the rising columns and disposed coaxially in sheaths, the lower part of the reaction tubes of one group being connected to the lower end of the corresponding rising column by "pig tails",
    means for feeding the reaction tubes with gas, means for the discharge of the gases from the rising columns and means for passing a heat-carrying fluid between the tubes and the sheaths,
    wherein the connection between the pig tails and the corresponding rising columns is effected on plates disposed at the lower ends of the rising columns for the discharge of the gases and provided with removable covers, and said converter further comprising at least three sheaths and a transverse partition freely attached to the lower ends of at least three of the sheaths, said partition having orifices for the free passage of the reaction tubes and of the rising columns.

2. A converter according to claim 1, wherein the attachment of the transverse partition to the lower ends of the sheaths is effected freely between stops disposed two by two on at least three of the sheaths.

* * * * *